United States Patent [19]

Ielo

[11] Patent Number: 5,095,652

[45] Date of Patent: Mar. 17, 1992

[54] TECHNIQUE FOR THE CULTIVATION OF PLANTS IN HOBBY AND PROTECTED AGRICULTURE

[75] Inventor: Domenico Ielo, Reggio Calabria, Italy

[73] Assignee: S.a.s. di D. Ielo & C., Reggio Calabria, Italy

[21] Appl. No.: 353,648

[22] PCT Filed: May 9, 1988

[86] PCT No.: PCT/IT88/00033

§ 371 Date: Mar. 31, 1989

§ 102(e) Date: Mar. 31, 1989

[87] PCT Pub. No.: WO89/00809

PCT Pub. Date: Feb. 9, 1989

[30] Foreign Application Priority Data

Jul. 31, 1987 [IT] Italy .................. 46508 A/87

[51] Int. Cl.⁵ .................................. A01G 9/02
[52] U.S. Cl. ........................................ 47/79
[58] Field of Search ............... 47/79, 40.5, 80, 66, 47/71, 59, 62–65

[56] References Cited

U.S. PATENT DOCUMENTS

| | | | |
|---|---|---|---|
| 82,052 | 9/1868 | Whitman | 47/80 |
| 352,247 | 11/1886 | Hunter | 47/79 |
| 3,758,987 | 9/1973 | Crane, Jr. | 47/38.1 |
| 4,083,146 | 4/1978 | Brankovic | 47/71 |
| 4,096,663 | 6/1978 | Silver | 47/80 |
| 4,171,593 | 10/1979 | Bigglestone | 47/79 |
| 4,270,309 | 6/1981 | Baumann | 47/79 |
| 4,557,070 | 12/1985 | Oyama | 47/80 |
| 4,647,740 | 3/1987 | Hansen et al. | 200/84 C |
| 4,663,884 | 6/1987 | Zeischegg et al. | 47/79 |
| 4,937,972 | 7/1990 | Freitus | 47/79 |

FOREIGN PATENT DOCUMENTS

| | | | |
|---|---|---|---|
| 451250 | 4/1913 | France . | |
| 1147068 | 11/1957 | France . | |
| 1210891 | 3/1960 | France . | |
| 1499814 | 10/1967 | France . | |
| 2278243 | 2/1976 | France | 47/79 |
| 361 | of 1859 | United Kingdom | 47/79 |
| 2131663 | 6/1984 | United Kingdom . | |

*Primary Examiner*—David A. Scherbel
*Assistant Examiner*—Michele A. Van Patten
*Attorney, Agent, or Firm*—Woodcock Washburn Kurtz Mackiewicz & Norris

[57] ABSTRACT

A Rastaplan TM system and container for the cultivation of plants. The methodology comprises a perfecting of the technique of subirrigation and is based mainly on a Rastaplan TM container-irrigator having on its peripheral structure a septum porous-roller without a bottom, the septum roller functioning as a continuous sub-irrigator of the substrate of cultivation, and on its internal structure, a truncated cone chamber that acts as a dripping chamber which permits aeration and subirrigation in sips around its own internal circumference. The Rastaplan TM container also includes an irrigation canal which acts as an evaporator distributor to allow the water level to oscillate between a minimum, under the border of the bottom of the container and a maximum, which is variable and regulable by a central float, which opens a closing needle of a water feeding duct to fill the irrigation canal as it dips below the minimum water level.

8 Claims, 1 Drawing Sheet

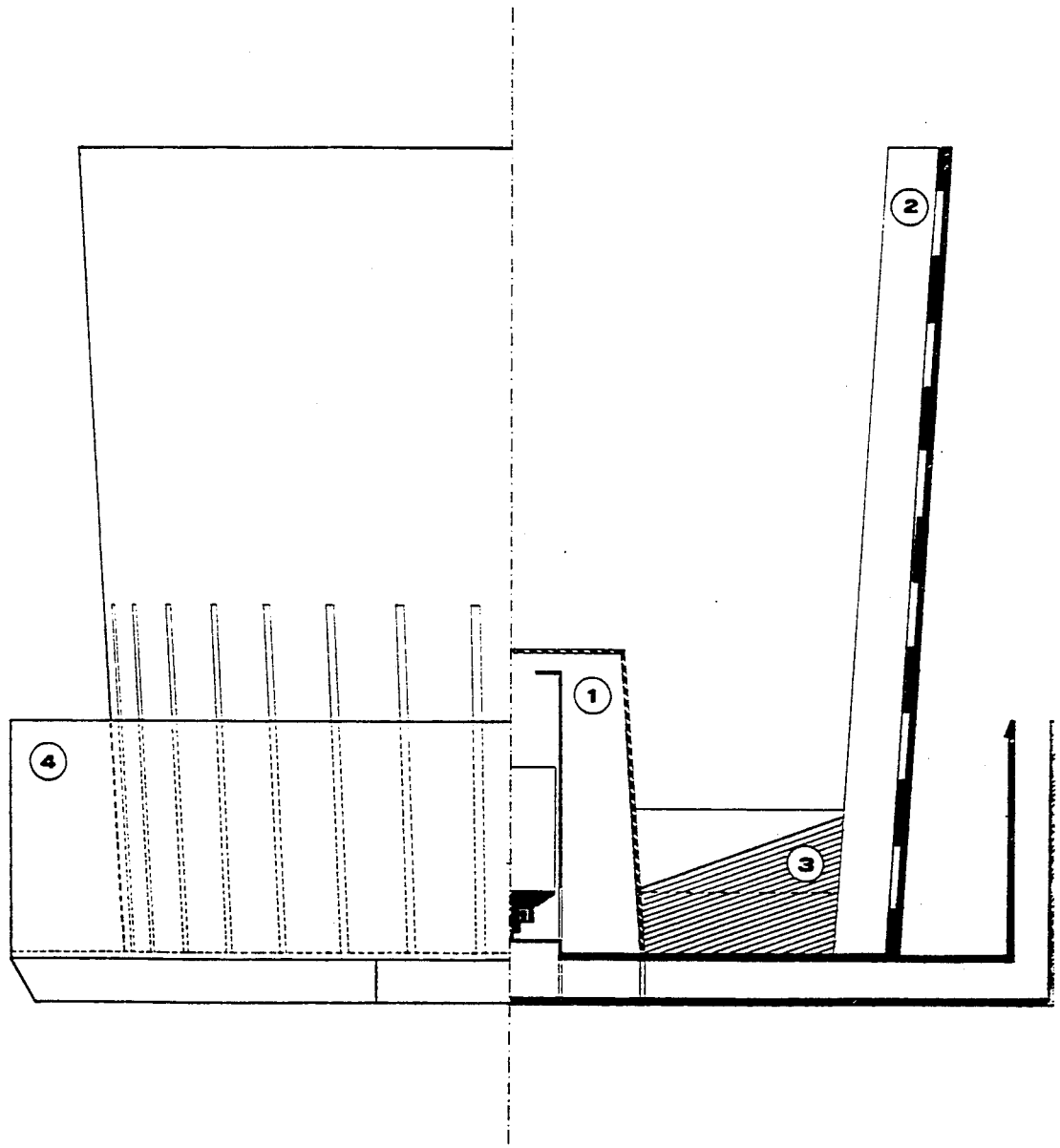

TECHNIQUE FOR THE CULTIVATION OF PLANTS IN HOBBY AND PROTECTED AGRICULTURE

BACKGROUND OF THE INVENTION

The invention relates to a Rastaplan TM system for the cultivation of plants, and more particularly, to a Rastaplan TM container which functions as an irrigator as well as a container.

SUMMARY OF THE INVENTION

An apparatus for maintaining a substrate of cultivation, comprising:

a base member having an irrigation canal for storing a supply of a vegetative liquid proximate to the substrate of cultivation;

first means for subirrigating the substrate of cultivation with the vegetative liquid, the first subirrigating means including an air chamber that is mounted on the base member and is separated from the substrate of cultivation by a perforated wall, and an inlet to the air chamber that is coupled to the irrigation canal;

second means for subirrigating the substrate of cultivation with the vegetative liquid, the second subirrigation means including a porous wall that is mounted on the base member about the perforated wall to contain the substrate of cultivation therebetween, and a bottom member that is mounted on the base member beneath the substrate of cultivation and is attached between the perforated wall and the porous wall, the porous wall having capillarity and the bottom member fluidically coupling the air chamber to the porous wall; and means for controlling admission of the vegetative liquid to the first and second subirrigating means so as to maintain the supply of vegetative liquid between a maximum level and a minimum level, whereby the bottom member is disposed at a level that is intermediate of the maximum and minimum levels such that the first subirrigating means intermittently subirrigates the substrate of cultivation through the perforated wall when the supply of vegetative liquid is above the intermediate level, and the second subirrigating means continuously subirrigates the substrate of cultivation peripherally through the porous wall when the supply of vegetative liquid is above the minimum level.

BRIEF DESCRIPTION OF THE DRAWING

The features of the invention which are believed to be novel are set forth with particularity in the appended claims. The invention, together with its objects and advantages, may be best understood by reference to the following description taken in conjunction with the accompanying drawing, of which:

The single FIGURE illustrates a Rastaplan TM container in accordance with the invention.

DETAILED DESCRIPTION OF A PREFERRED EMBODIMENT

A Rastaplan TM container in accordance with the invention, in addition to its main task as a container of the substrate, may also be used as an irrigator by properly constructing the container and choosing tufted materials for cultivation. In other words, the Rastaplan TM container of the invention interacts positively and actively with that small confined environment that is the substrate of cultivation so as to assure extremely good conditions for the growth and life of the root system on which the plant depends.

These conditions for the growth and life of the root system include:

sufficient and constant humidity;
good drainage;
sufficient circulation of air; and
good thermal heat insulation as a defense against a sudden change in external temperature.

As illustrated in the FIGURE, the Rastaplan TM container in accordance with the invention is made up of a container structure 1 of plastic material or some other impermeable material. Preferably, the container structure 1 is equipped with an underneath truncated cone chamber 1a with windows or microperforations, the chamber 1a acting as an air or a dripping chamber which permits an aerated subirrigation channel around its own internal circumference. The container of the invention further includes a septum porous-roller 2 without a bottom, functioning as a continuous subirrigator of the substrate of cultivation. The septum-roller 2 is made up mainly of porous-inert materials and plastic polymers chosen for their functions of capillary reascending of the water, hydric retention and air capacity. The septum-roller 2 stands between the water and substrate and acts as a hydric plug, an air plug, and as a thermal plug for the air-water inert system. Preferably, the septum-roller 2 is inert and is a good thermal heat insulator.

The container of the invention also includes an expanded polystyrene disc 3 which acts as a bottom and can be inserted in the cone-shaped dripping air chamber 1a. The disc 3 acts as a bottom of the carrying structure, which is molded so as to have a low window, a tube that puts the dripping chamber 1a in contact with the wall of the septum-roller 2, and an inclination towards the internal air chamber 1a that puts the border of the disc 3 at about 2 cm. from the bottom that represents the level of water flow. In some applications, the cone of the air tube 1a may be formed of polystyrene and is the only thing used in conjunction with the above-mentioned disc 3. In other applications, a water filter across the interspaces of the polystyrene air tube pearls and, consequently, the whole of the bottom surface of the container is either a draining seat or used for watering.

The container of the invention further includes a level or flat irrigation canal 4 whose water level 4a is regulated by a float 5. In the simple case illustrated in the FIGURE, the float 5 is single and the irrigation canal 4 works as an evaporator distributor. The water level 4a oscillates between a minimum (MIN), under the level of water overflow, and a maximum (MAX), which is variable over this minimum level. This arrangement provokes the irrigation and consequently the subirrigation which occurs in sips around the internal circumference of the container.

The flat irrigation canal 4 and the septum-roller 2 make up, in this case, an integral evaporator; in fact, the transpiration is correlated by means of an external circle 4a of water and the internal surface of the septum-roller 2, either by the external environmental factors such as temperature, solar radiation, Ur air, or those internal factors relative to the dispersal humidity of the septum porous-roller 2 towards the substrate. The result is a rational and functional subirrigation technique which is continuous and indirect when received in sips through the septum-roller 2 about the periphery of the substrate, and direct when received from the internal ring of the air chamber 1a. Such subirrigation is a direct function of the external environmental conditions and the hydric requirements of the substrate.

The Rastaplan TM container of the invention is connected to a source of water that in the case illustrated in the FIGURE is a water feeding duct 7 connected to a tank that supplies more water. The water level 4a is maintained according to the principle of communicating pots at the moment that the float 5 goes down to the minimum level and opens the security pin 6. Such a float 5 may include means for magnetic calibration. For this reason, the contact of the opening is operated by a magnet of the float 5 when it descends to a very low water level. On the other hand, at a higher water level the push of floating of the float 5 detaches the contact opening which otherwise closes the aerator opening.

For professional systems in which the hydric state of the substrate is to be determined, an electric sensor may be adopted to regulate the level and frequency of irrigation, and consequently, the level of humidity of the earth is considered very good. The dripping air chamber 1a of the invention avoids the asphyxiation of the roots as a result of a non-stop capillary rise and, therefore, simplifies the technique of subirrigation in that the sand stratification of the bank or of the subirrigation carpet is not necessary.

Pots for ornamental plants today are made from materials such as fired clay or plastic materials (polypropylene, polyethylene, polystyrene, AU, etc). The use of one or the other involves some variations in the physical conditions of the substrate of cultivation due to the different porosity of the two materials. For example, porosity is non-existent in the plastic materials but is relevant when fired clay is used. The porosity of the walls of a pot made of fired clay causes:

an extension of the evaporating surface;

a favorable gas exchange between the substrate and the external environment;

good drainage; and a uniform and more constant distribution of humidity (imbibition of the fired clay).

However, when the air is not confined but ventilated within a temperature range, such a outside of the context of protected cultivation, the porosity of fired clay causes a series of inconveniences due to the extreme amount of water loss through evaporation which may occur. As a result:

the temperature of the substrate is lowered;

nutritive salts are removed by the absorption of the roots due to their insolubility on the porous walls of fired clay;

more frequent irrigated interventions are caused, with a risk of washing away the substrate; and excessive and harmful salinity of the walls of the pot may be caused by salt deposits.

On the other hand, when plastic pots are used, due to the absence of the permeability of water and air through the plastic materials, a limited exchange of gases occurs, and such gas exchange is only on the superior surface of the substrate. In other words, from the beginning of the cultivation to the choice of a substrate with the characteristic of high porosity, despite their poor drainage plastic pots are favored, particularly in conditions of protected cultivation. Plastic pots are preferred because of their medium Ur and hence the low evaporating power of the air.

Out of the context of protected cultivation, plastic pots do not present the inconveniences mentioned above for fired clay because of the impermeability and sterility of plastic materials. However, plastic pots present other problems such as:

poor drainage;

poor heat insulation by the plastic walls, thereby making external use undesirable because without adequate insulation overheating of the substrate would result; and furthermore, irrigation needs more attention when plastic pots are used than when the cultivation occurs in clay fired pots because clay fired pots avoid the risks of excess water and the resulting asphyxiation of the roots.

In view of the above considerations, a desirable plastic material for use in the invention is polystyrene expanded, for it has fantastic capacity as a heat insulator. However, for aesthetic reasons polystyrene expanded limits the use of the invention in alveolar and sowing pots.

Accordingly, the Rastaplan TM container of the invention is designed to bring together the advantages of fired clay materials (porosity) and those of plastic materials (sterility, impermeability, less specific weight and non-fragile annulling), while at the same time eliminating the negative aspects of both materials. Furthermore, the Rastaplan TM system of the invention reevaluates the technique of subirrigation that is specialized in by:

continuous subirrigation by air by the septum-roller 2; and subirrigation in sips (and in air) by the internal dripping chamber1a.

The porosity of the septum-roller 2, given the porous inert materials that form it, is obviously much more than that of fired clay. The septum-roller 2 forms a specialized substrate, with a constant dimensional structure, that surrounds the organic substrate of cultivation. Moreover, the root apparatus that inevitably moves to the internal wall of the septum-roller 2 does not move to the pot and instead installs itself on the circumference of the septum-roller 2, where a close-meshed net of capillary roots accomplishes a condition of hydroponic absorption. The physical and glomerule structure of the septum-roller 2 allows the rise again of the water by the capillary in the interstitial and in the internal granule itself; this causes the hydric capacity of the septum-roller 2 to be tied to the granulation and to the capacity of hydric retention of the inert material of which it is constructed.

Through experimentation, very good values for the hydric capacity of the septum-roller 2 have been obtained when about 20%-40% of the volume is air capacity, which is possible with a wide range of inert porous materials and plastic polymers such as Perlite, Vermiculite, expanded clay, scoria carbon, nylon fibers not woven, polyamide fibers, polyesters, expanded uremic resin, and the like. Using such materials, it is possible to regulate the proportion between the solid state, liquid and gaseous state according to the conditions and the cultivation needs. It is also possible in accordance with the invention to indicate the interaction of water-roller-substrate-air and to determine the desired interaction. Thus, the septum-roller 2 extends the evaporating surface of the external ring of water 4a towards the inside and works, together with the irrigation canal 4, as an evaporator distributor responsive to the thermoigrometric external conditions and the hydric needs of the substrate of cultivation towards which the septum-roller 2 directs a continuous and immediate dispersal of humidity.

The hydric field in which the septum-roller 2 works has a potential which goes from values close to the zero of the base to values lower and lower towards the upper part thereof to a level of about −5 centibar. The capillary water of the septum-roller 2 moves towards the substrate by a tension gradient, with a crossed directional to that of the capillary rise of the distributor plate that at its turn is mentioned and correlated to the loss of water by evaporation. The hydric reinstatement moves generally in a hydric field with a potential of about −10 centibar. Also, the circulation of the humidity in the internal substrate of cultivation is even and constant and has capillary water circulating between −0.5 and −10 centibar.

For specific cultivation needs from hygrophytes to xerophytes, the potential hydric field of the invention can be restricted or widened by the standard cited. Thus, for operating on levels and frequency of irrigation, the Rastaplan TM system of the invention is therefore an elastic system which is adaptable to different cultivation needs and a dynamic system which is tied to the evaporation and to the absorption of the root system. Moreover, the invention has the particular benefits that the subirrigation is in sips correlated to the evaporimetric needs of the substrate system-plant atmosphere, thereby permitting the irrigation of water in a very fast and precise manner without hydric stress. Also, by the adoption of the dripping air chamber 1a, maximum drainage as well as the ventilation in the points where the potential hydric is near zero is permitted. As a result, the invention avoids stagnation as well as saturation due to an uninterrupted capillary rise.

The Rastaplan TM system of the invention, in addition to creating an advanced building technique for plant containers, puts into simple practice the best possible cultivating conditions, such as:

The hydric supply of the septum-roller 2 by the evaporator plate is frequent and continuous; therefore, the plants may respond uninterruptedly to their vegetative stimuli.

The permanence of a sufficient humidity of the substrate causes the responsibility of providing an estimate of the hydric needs to be unnecessary.

The invention is extremely variable for the different types and for the different pedologic and climatic conditions.

Generally, but above all in protected cultivation, with the Rastaplan TM system of the invention there is a better phytosanitary control of the hypogenous part of the plants. Furthermore, the use of the septum-roller 2 makes biological control of the substrate of cultivation possible. For example, among the constituents of the septum-roller 2 there may be some defibrated bark of forest plants that possesses specific and repressive micro-organisms for prevention of tracheomycosis.

Other advantages of the invention include:
a minor environmental impact on the cultivation;
a relevant saving of energy with very good production results, due to the heating at a low thermic exchange of the basal water;
automation of the cultivating operations;
a more rational program of nutrition for the Rastaplan TM System may be conveniently applied to a manuring of the base of the organic substrate and a heavy irrigation of support at a low mineral content to cause specialized absorption that is carried out on the inert portions of the septum-roller 2 and the insoluble portions that could be verified in the cultivated substrate; and given the particular structure and functioning of the Rastaplan TM system of the invention, repotting is remarkably postponed, and even extremely easy, with the possibility that the septum-roller 2 may be used to facilitate repotting.

The industrial basket 1 for the septum-roller 2 can be a permanent basket, made temporary by means of water-soluble bindings, or free in a fibre sheath of non-polypropylene material. The structure of the basket 1 depends upon the cultivation needs, and it can be flat on its whole surface, or like in the septum-roller case illustrated, lathing or spiral.

The septum-roller 2 in some applications is present around the circumference of the dripping air chamber 1a. The dimensions of the septum-roller 2 may be as far as 30 cm. in diameter and height, which permits a wide cultivation of most of the ornamental plants today on the market. Moreover, for special cultivation of long cycle, shrub and ornamental citrus in a pot, whose height and diameter do not allow the hydric potential necessary to the cultivation needs to be maintained, the reinstatement of the irrigation level may be carried out from the top of the septum-roller 2.

Although the invention has been illustrated in the FIGURE as a single embodiment, it will be understood that the Rastaplan TM System of the invention in its whole is a system for professional and amateur cultivation of plants in containers, whether they be pots, cases, banks, large chests, banquetts, phytocells, sowing containers, and the like. Among these other forms of realization, the invention includes the construction of bank, banquett, and generally large cases of vegetation, as well as a polystyrene bottom of low density and high seed pearl with the peculiarity and functionality of irrigation level and drainage with the illustrated bottom. The invention may be further coupled to a load bearing structure of expanded polystyrene having a higher density, in whose interstices profitably has been applied an aerothermic conditioning of the base.

Within the limits of the invention, modifications in accordance with the constructive applications may be produced. For example, for ornamental firing of pottery, the invention may utilize porous lateritic materials including a high amount of carbon residue. The production of the porous lateritic materials has been obtained by the firing of calcareous magnesic clays, prevalently filled with worn out husks, which fossilize and produce the carbon residue. In this case, the outside and area may be waterproofed to allow crystal covering. The peculiar feature of this material for pottery is the high amount of carbon residue which makes a refractory surface for the prevention of the formation of algae, fungi and micro-organisms of various kinds of the pottery surface. By contrast, such micro-organisms readily install themselves in terra-cotta. Such pottery material of the invention also has the properties of thermic inertness and hydroabsorption necessary for the septum-roller 2.

I claim:

1. Apparatus for maintaining a substrate of cultivation, comprising:
   a base member having an irrigation canal for storing a supply of a vegetative liquid proximate to the substrate of cultivation;
   first means for subirrigating the substrate of cultivation with said vegetative liquid, said first subirrigating means including an air chamber that is mounted on said base member and is separated from the substrate of cultivation by a perforated wall, and an inlet to said air chamber that is coupled to said irrigation canal;

second means for subirrigating the substrate of cultivation with said vegetative liquid, said second subirrigation means including a porous wall that is mounted on said base member about said perforated wall to contain the substrate of cultivation therebetween, and a bottom member that is mounted on said base member beneath said substrate of cultivation and is attached between said perforated wall and said porous wall, said porous wall having capillarity and said bottom member fluidically coupling said air chamber to said porous wall; and means for controlling admission of said vegetative liquid to said first and second subirrigating means so as to maintain said supply of vegetative liquid between a maximum level and a minimum level, whereby said bottom member is disposed at a level that is intermediate of said maximum and minimum levels such that said first subirrigating means intermittently subirrigates the substrate of cultivation through said perforated wall when said supply of vegetative liquid is above said intermediate level, and said second subirrigating means continuously subirrigates the substrate of cultivation peripherally through said porous wall when said supply of vegetative liquid is above said minimum level.

2. A container for the cultivation of plants, comprising:

a base member for storing a supply of a vegetative liquid;

a porous bottomless pot placed on said base member, said porous bottom less pot and said base member together forming an area of containing soil;

an impermeable bottomless pot substantially concentric with and closely surrounding said porous bottomless pot;

an air chamber mounted on said base member and beneath said area for containing soil, said air chamber being separated from said soil by a perforated wall and coupled to said supply of said vegetative liquid; and a porous bottom member mounted on said base member beneath said area for containing soil so as to fluidically couple said air chamber to said porous bottomless pot.

3. A container as in claim 2, further comprising a float disposed within said air chamber so as to determine a level of said supply of said vegetative liquid and a closing needle responsive to the level of said float for selectively connecting said air chamber to said supply of said vegetative liquid when said float reaches a minimum level.

4. A container as in claim 3, wherein said porous bottom member surrounds said air chamber and has a lessening thickness from its periphery towards its center.

5. A container as in claim 4, wherein said bottom member comprises low density expanded polystyrene and high speed pearl.

6. A container as in claim 2, wherein said porous bottomless pot comprises low density expanded polystyrene and high seed pearl.

7. A container as in claim 2, wherein said porous bottomless pot comprises a pottery material with a high amount of carbon residue.

8. A container as in claim 7, wherein said pottery material comprises a mixture of calcareous magnesic clay mixed with worn out husks which when fired form said carbon residue.

* * * * *